United States Patent [19]

Brandl et al.

[11] 4,092,424
[45] May 30, 1978

[54] ANTIBIOTIC DERIVATIVES

[75] Inventors: Ernst Brandl; Franz Knauseder, both of Tyrol; Franz Rembold, Vienna, all of Austria

[73] Assignee: Biochemie Ges.m.b.H., Vienna, Austria

[21] Appl. No.: 612,321

[22] Filed: Sep. 11, 1975

Related U.S. Application Data

[62] Division of Ser. No. 660,206, Aug. 14, 1967, Pat. No. 3,949,079.

[30] Foreign Application Priority Data

Apr. 17, 1964  Australia .............................. 3402/64

[51] Int. Cl.$^2$ ..................... C07C 69/66; A61K 31/225
[52] U.S. Cl. ...................................... 424/299; 560/188
[58] Field of Search ................. 260/484; 424/314, 299

[56] References Cited

PUBLICATIONS

Anchel, M., J. Biol. Chem., 199, 133–9, (1952).

*Primary Examiner*—Paul J. Killos
*Attorney, Agent, or Firm*—Watson, Cole, Grindle & Watson

[57] ABSTRACT

Disclosed is a process for producing the antibiotic pleuromutilin by cultivating strains of *Clitopilus passeckerianus* (Pil.) Sing in an aqueous nutrient medium. The production of esters of pleuromutilin and hydrogenation products thereof are also described. The pleuromutilin and derivatives thereof are useful as an antibacterial ingredient in animal feed compositions.

The disclosure also describes derivatives of pleuromutilin which are useful in veterinary medicine. These derivatives include esters obtained by reacting pleuromutilin or its hydrogenation products with reactive compounds such as acid halides, acid anhydrides, esters and the like, of isocyanic acid, aliphatic monocarboxylic acids or dicarboxylic acids containing at least 3 carbon atoms or sulfonic acids.

6 Claims, No Drawings

ANTIBIOTIC DERIVATIVES

CROSS REFERENCE TO RELATED APPLICATION

This is a divisional of co-pending application Ser. No. 660,206, filed Aug. 14, 1967, now U.S. Pat. No. 3,949,079.

This invention relates to ready-mixed animal foods, to food supplements for preparing ready-mixed animal foods and to a process for preparing ready-mixed animal foods.

It is well known in the art that the addition of such antibiotics as penicillin, chlorotetracycline, oxytetracycline and bacitracin to basic animal foods improves the utilization of the food by the animal and increases its growth rate with no harmful effects, either to the animal itself or to a consumer of the meat products derived from such animals. It is also well known in the art, however, that the use of antibiotics having application in human therapy in animal foods is considered hazardous as there is a likelihood of the sensibilization of the macroorganism upon consumption of the antibiotic by the animals.

It is an object of the present invention to provide a food supplement for animals containing an antibiotic which will promote the growth rate of the animals with no concurrent danger to the animals or to any consumer of any meat product derived therefrom.

It is a further object of the present invention to provide ready-mixed animal foods containing the aforementioned food supplement.

It is a further object of the present invention to provide a process for the preparation of such food supplements and ready-mixed animal foods.

It is a yet further object of this invention to provide a therapeutic composition useful in veterinary medicine. In order to provide compositions suitable for this application, the antibiotic BC 757 is most advantageously used, and in fact is used in the form of a water-soluble derivative thereof. The invention extends to a process for producing such water-soluble derivatives, and to therapeutic compositions containing such derivatives.

Another object of the present invention is to provide economical means for the production of the antibiotic BC 757 by the use of two new strains.

The antibiotic BC 757, its derivatives or mixtures thereof, are added to animal feeds and supplements therefor. It has now been found that this antibiotic and its derivatives are useful additives for animal foods and afford advantages over the antibiotics heretofore used as food supplements. It has also been found that the antibiotic and its derivatives according to the present invention have no deleterious affect, either on the animals to which they are fed or on consumers of meat products derived from such animals.

The antibiotic identified in the specification and claims as "BC 757" has the empirical molecular formula $C_{22}H_{34}O_5$ (Molecular weight 378); is readily soluble in alcohol, ether, butyl acetate, acetone, methylisobutylketone, tetraglycol, and chloroform, but difficultly soluble in water, petroleum ether and cyclohexane; melts at 167° C [crystallized from $H_2O:C_2H_5OH(4:1)$]; has an optical rotation $[\alpha]_D^{20} = +32°$ (10% in chloroform); and exhibits characteristic absorption maximn in the ultra-violet spectrum at 205 and 293 m$\mu$ (in ether) or 209 and 290 m$\mu$ (in 60% ethanol), respectively, and characteristic absorption bands in the infra-red spectrum (potassium bromide pressings) at 3400, 3000, 1235 and 1095 and in a methylene chloride solution at 3570, 3610, 1730, 1040 and 1630 $cm^{-1}$. Recent investigations have lead to the conclusion that the antibiotic designated as BC 757 is identical with pleuromutilin, described, e.g., in *Proc. Nat. Acad. Sci.*, page 570 (1951), Vol. 37 (Frederick Kavanagh et al). In addition, it has been found that BC 757 has no useful application in the field of human therapy because its therapeutic index as well as the therapeutic indices of its water-soluble derivatives are too low. Surprisingly, it has been found that BC 757 as well as its derivatives or mixtures thereof are especially suitable as additions to animal foods and will increase the rate of growth of animals consuming the animal food.

BC 757 is obtained by the fermentation of Clitopilus passeckerianus (Pil.) Sing., which belongs to the family of Tricholomataceae in the order Agaricales of the class Basidiomycetes, or by mutants and variants thereof. Cultures of the above-mentioned organism Clitopilus passeckerianus were deposited with the Fermentation Division of the Northern Regional Research Laboratories (NRRL), Peoria, Illinois, where they were included in the collection of microorganisms under number 3100. The designation Clitopilus passeckerianus seems to be synonymous with Pleurotus passeckerianus.

Upon producing a feed stuff antibiotic, its practical utilizability depends to a great extent on an economical means of production, as only a low price is tolerated when an antibiotic is used in such a field of application.

In this connection the capacity of the producing strain is of particular importance. For this reason a number of isolations from nature and variants produced from the same were tested as regards their antibiotic-forming capacity.

The variant V29 obtained in the laboratory from a Clitopilus passeckerianus (Pil.) Sing. strain isolated from nature gives a particularly high fermentation yield of pleuromutilin. Cultures of this strain were deposited with the United States Department of Agricultural Research Service under the reference NRRL 3279.

A culture solution was prepared by submerged culture of Clitopilus passeckerianus at 24° C in a nutrient solution containing sources of nitrogen and carbohydrates.

The following Table gives a summary of the productivity of the strain NRRL 3100 which we have already deposited at an earlier date and the strain NRRL 3279 as compared with the strains described in the literature.

| Strain | Yields: mg of isolated pleuromutilin from 1 liter culture |
|---|---|
| Pleurotus mutilis (Fr.) Saco. | 50[1] |
| Pleurotus passeckerianus Pilat | << 50[1] |
| Drosophila subatrata | small amounts together with drosophilin A, C and D (Drosophilin B - pleuromutilin) |
| Clitopilus passeckerianus (Pil.) Sing. NRRL 3100 | 2390 crude product, corresponding to 1960 100% pure substance |
| Clitopilus passeckerianus (Pil.) Sing. NRRL 3279 | 3630 crude product, corresponding to 3160 100% pure substance |

The discovery that in the case of the strains of our invention the major portion of the antibiotic is present in the residue liberated from the culture liquor, as opposed to the literature according to which only a small amount of an alcohol-soluble antibiotic material is present in the mycelium, should be considered as new knowledge in accordance with the invention, which essentially disagrees with the present technical knowledge and which facilitates the detection of productive strains and thus leads to an important technical improvement. Therefore, the method used by us for the obtention of the antibiotic also differs essentially from the methods described in the literature [1,2].

Cited literature:
1. Kavanagh F., Hervey A. and Robbins W. J., *Proc. Nat. Acad. Sci.*, 37, 570 (1951)
2. Anchel M., *J. Biol. Chem.*, 199, 133 (1952)

The following Examples illustrate this:

1.
10 liters of fermentation mash from a fermentation charge with Clitopilus passeckerianus NRRL 3100 were separated into 1.8 liters of culture filtrate and mycelium by filtration over a pressure-suction filter.

a. Extraction of the antibiotic from the culture filtrate:

The 8.1 liters of filtrate were extracted twice with 1.6 liters each of ethyl acetate at natural pH (∼6.8), whereby the entire active material passed over to the organic phase. This was dehydrated with $Na_2SO_4$ sicc., concentrated as far as possible in a vacuum, and finally 50 ml of diethyl ether were added thereto. After standing at +3° C for 24 hours, the antibiotic was obtained in crystalline form. It was filtered with suction, washed twice with 50 ml of petroleum ether (boiling point 60°–80°) and finally dried at room temperature in a vacuum. 5.1 g of crude product, having a degree of purity of 86.2% and corresponding to 4.4 g of pure material, were obtained.

b. Extraction of the antibiotic from the mycelium:

The moist mycelium was extracted thrice, each time for 30 minutes, with 3.4 liters of technical acetone (water content ∼ 9%) while stirring vigorously. After combining the extracts and evaporating the acetone in a vacuum, 2.0 liters of aqueous phase were obtained as residue, from which the antibiotic already precipitated. The suspension was then extracted twice with 0.5 liters each of ethyl acetate (DAB 6), the extract was washed once with 1 liter of a 5% $Na_2CO_3$ solution and subsequently with $H_2O$ until a neutral reaction was obtained. Upon subsequent dehydration with $Na_2SO_4$ sicc. and concentration in a vacuum the antibiotic was obtained in crystalline form. 100 ml of ether were added to the residue and this was allowed to stand at +3° C for 24 hours. After filtering with suction and washing the crystalline material with 200 ml of petroleum ether (boiling point 60°–80°), 18.8 g of crude product, having a degree of purity of 81.0% and corresponding to 15.2 g of pure substance, were obtained. A total of 5.1 g + 18.8 g = 23.9 g of crude product, corresponding to 4.4 g + 15.2 g = 19.6 g of pure product, was obtained from 10 liters of culture.

2.
10 liters of fermentation mash from a fermentation charge with Clitopilus passeckerianus V29 NRRL 3279 were separated into 8.5 liters of culture filtrate and mycelium by filtration over a pressure suction filter.

a. Extraction of the antibiotic from the culture filtrate:

The 8.5 liters of filtrate were extracted twice with 1.7 liters each of ethyl acetate at natural pH (∼6.5). The further working up was effected in a manner analogous to that indicated in the Example for Clitopilus passeckerianus NRRL 3100. 4.8 g of crude product, having a degree of purity of 85.5% and corresponding to 4.1 g of pure substance, were obtained.

b. Extraction of the antibiotic from the mycelium:

The moist mycelium was extracted thrice, for 30 minutes each time, with 2.6 liters of technical acetone (water content ∼ 9%) while stirring vigorously.

After combining the extracts and evaporating the acetone in a vacuum, 1.5 liters of aqueous phase were obtained, from which the antibiotic already precipitated. The further working up was effected in a manner analogous to that indicated in the preceding Example, whereby 31.5 g of active material, having a degree of purity of 87.3% and corresponding to 27.5 g of pure substance, were obtained.

A total of 4.8 g + 31.5 g = 36.3 g of crude product, corresponding to 4.1 g + 27.5 g = 31.6 g of pure product, was obtained from 10 liters of culture. The obtention of a BC 757-containing cake by evaporating the culture mash after fermentation or the mycelium separated from the liquor by filtration, is particularly simple and economical when the strain NRRL 3279 is used. Due to the mycelium's high content of antibiotic it is possible in this manner to obtain a preliminary mixture for the preparation of the ready feed containing 5% of dry active material.

In general, in one aspect thereof, the present invention provides a process for producing derivatives of the antibiotic BC 757 or its hydrogenation product, which comprises reacting BC 757 or its hydrogenation product with a reactive derivative of an acid selected from isocyanic acid, an aliphatic monocarboxylic or dicarboxylic acid containing from 3 to 16 carbon atoms, or a sulphonic acid, and optionally reacting the resulting product with an acid or a base.

Examples of derivatives of the antibiotic BC 757 which are also useful as food supplements are the hydrogenation products of BC 757 and products obtained by reacting BC 757 or its hydrogenation products with reactive derivatives, e.g., acid halides, acid anhydrides, esters and the like, of isocyanic acid, aliphatic monocarboxylic acids or dicarboxylic acids containing at least 3 carbon atoms or sulfonic acids. The resultant reaction products may then be treated with an acid, such as HCl and/or with a base, such as NaOH, sodium bicarbonate and trialkylamine, if necessary, to obtain the desired water-soluble derivatives. The water-soluble derivatives of BC 757 thus obtained may themselves be hydrogenated without any impairment of their water solubility and activity. If the reaction products are intended to be treated with acids and/or bases, then hydrogenation may be performed before or after this treatment.

Examples of such derivatives of BC 757 or of its hydrogenation products may be those products obtained by reaction of BC 757 or its hydrogenation product with:

(a) isocyanic acid esters of the general formula

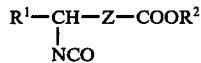

wherein $R^1$ is hydrogen, alkyl having up to 6 carbon atoms, carbalkoxy, carbalkoxyalkyl or aryl, $R^2$ is alkyl having from 1 to 5 carbon atoms inclusive and Z is a direct C-C bond or the grouping $-(CH_2)_n-$, $n$ being an integer between 1 and 6; the reaction product may be selectively hydrolyzed in the presence of a base;

(b) a halide or anhydride of an acid of the general formula $$R^3-(R^4)_m-COOH$$

wherein $R^3$ is a halogen atom, particularly a chlorine or bromine atom, $R^4$ is a branched or unbranched alkylene radical, particularly methylene, and $m$ is either zero or an integer between 1 and 10;

(c) a halide or anhydride of a dicarboxylic acid of the general formula $$(R^4)_p\begin{matrix}\nearrow COOH \\ \searrow COOH\end{matrix}$$

wherein $R^4$ has the above specified meaning and $p$ is an integer between 1 and 12;

(d) halides and anhydrides of sulphonic acids of the general formula $$HOOC-(R^5)_n-SO_2OH$$

wherein $R^5$ is a branched or unbranched alkylene radical or a substituted or unsubstituted phenylene radical and $n$ is an integer.

Particular examples of such derivatives are the reaction products of BC 757 with ethyl α-isocyanatopropionate, phosgene, diethyl α-isocyanatoglutarate, ethyl isocyanatoacetate, palmitic acid chloride, succinic anhydride, β-sulphopropionic anhydride, m-carboxybenzene sulphochloride or with chloroacetylchloride; the last-named reaction product may then be treated with dimethylamino, if desired, to obtain a water-soluble derivative.

It is to be understood that both water-soluble and water-insoluble derivatives are useful for the purposes of this invention.

Physical-chemical characteristics of some water-soluble derivatives of BC 757 are given below:

1. BC 757 SUCCINATE (FREE ACID)

a. UV spectrum: little characteristic.

b. IR spectrum: Was taken in KBr and in $CHCl_3$.

The spectrum taken in $CHCl_3$ solution was used for characterization.

Interpretation of the spectrum in $CHCl_3$ (1% solution, thickness of layer 0.5 mm):

| Wave number (cm$^{-1}$) | Band | Assigned to |
|---|---|---|
| 3500 | blurred | —OH ass. |
| 3000–2860 | clear | —CH$_3$, —CH$_2$— |
| 2700–2500 | hinted | —COOH |
| 1740 | clear | carbonyl function (superposition of >C—O, —COOR, —COOH) |
| 1450, 1380 | clear | presumably CH— oscillations |
| 1150 | clear | probably >CO (superposition) |
| 1115 | clear | —OH sec. |
| 1010 | clear | C—O valency oscillation | c. Equivalent weight: theoretical — 478; found — 469

2. BC 757 GLUTARATE (FREE ACID)

a. UV spectrum: little characteristic b. IR spectrum: essentially identical with that of the BC 757 succinate.

Variations: in the range 1500–1360 cm$^{-1}$ inflection at 1460, small band at 1410 cm$^{-1}$.

c. Equivalent weight: theoretical — 492; found — 484

3. BC 757 PHTHALATE (FREE ACID)

a. UV spectrum: little characteristic.

b. IV spectrum:

| Wave number (cm$^{-1}$) | Band | Assigned to |
|---|---|---|
| 3680 | quite clear | —OH valency oscillation? |
| 3500 | blurred | —OH ass. |
| 3000–2860 | clear | —CH$_3$, —CH$_2$— |
| 2700–1500 | hinted | —COOH |
| 2000–1800 | hinted | aromat. |
| 1740 | clear | carbonyl function (superposition of >CO, —COOR, —COOH) |
| 1600, 1580 | clear | aromat. |
| 1450, 1375 | clear | presumably CH— oscillations |
| 1115 | clear | —OH sec. |
| 1080 | clear | aromat.? |
| 1010 | clear | C—O—valency oscillation | c. Equivalent weight: theoretical — 526; found — 514

The equivalent weight was determined by the titration method in 50% ethanol.

4. N-CARBOXYMETHYLCARBAMYL DERIVATIVE OF BC 757 (FREE ACID)

IR spectrum: taken in $CHCl_3$ (1% solution, thickeness of layer 0.5 mm)

| Wave number (cm$^{-1}$) | Band | Assigned to |
|---|---|---|
| 3440 | clear | —CONHR— |
| 3000–2870 | clear | —CH$_3$, —CH$_2$— |
| 2700–2500 | hinted | —COOH |
| 1730 | clear | superposition of the individual carbonyl functions |
| 1605 | clear | presumably —NHR— deformation oscillation |
| 1500 | clear | source unknown |
| 1120 | clear | presumably —OH sec. |

5. N-(α-CARBOXYETHYL)-CARBAMOYL DERIVATIVE OF BC 757 (FREE ACID) IR spectrum:

| Wave number (cm$^{-1}$) | Band | Assigned to |
|---|---|---|
| 3435 | clear | —CONHR— |
| 3000–2870 | clear | —CH$_3$, —CH$_2$— |
| 2700–2500 | hinted | —COOH |
| 1730 | clear | superposition of the individual carbonyl functions |
| 1600 | clear | presumably —NHR— deformation oscillation |
| 1500 | clear | source unknown |
| 1120 | blurred | presumably —OH sec. |

6. N-(α-CARBOXYBENZYL)-CARBAMOYL DERIVATIVE OF BC 757 (FREE ACID) IR spectrum:

| Wave number (cm$^{-1}$) | Band | Assigned to |
|---|---|---|
| 3430 | clear | —CONHR— |

-continued

| Wave number (cm$^{-1}$) | Band | Assigned to |
| --- | --- | --- |
| 3000–2870 | clear | —CH$_3$, —CH$_2$— |
| 2700–2500 | hinted | —COOH |
| 1730 | clear | superposition of the individual carbonyl functions |
| 1605 | clear | presumably —NHR-deformation oscillation |
| 1495 | clear | source unknown |
| 1115 | clear | presumably —OH sec. |

Spectrum taken in KBr (1.5 mg/300 mg):

| Wave number | Band | Assigned to |
| --- | --- | --- |
| 720, 700 | clear | monosubstituted aromatic. |

The UV spectra were taken in absolute alcohol with a Zeiss spectrophotometer RPQ 20 AV.

The IR spectra were taken with a Perkin-Elmer apparatus 237.

Examples of processes for producing derivatives of the antibiotic BC 757 are as follows:

EXAMPLE 4

The reaction product of BC 757 with the ethyl ester of α-isocyanatopropionic acid.

1.0 g. (0.007 mol) of the ethyl ester of α-isocyanatopropionic acid was refluxed with 2.6 g. of BC 757 (0.007 mol) in 25 ml of xylene for 5 hours, at the end of which 2.5 ml of pyridine were added and heating was continued for another 25 minutes. The solvent was driven off in a vacuum, the residue taken up in alcohol and the resultant reaction product treated with equivalent quantities of alcoholic NaCH at room temperature. The ethyl ester was thus saponified. After removal of the alcohol at reduced pressure, the sodium salt precipitated in the form of a white amorphous powder. This was filtered off on a suction filter, washed with ether and dried. 1.6 g of a product readily soluble in water was thus obtained. The empirical formula $C_{26}H_{38}O_8MNa$ was ascribed to the compound.

Calculated: N = 2.72%; Found: N = 2.70%.
Equivalent weight of the free acid:
Calculated: 493; Found: 400.

EXAMPLE 5

The reaction product of BC 757 with the diethyl ester of α-isocyanatoglutaric acid.

In a manner analogous to that described in Example 4 BC 757 was reacted with the diethyl ester of α-isocyanatoglutaric acid. A product which very readily dissolved in water was obtained. The empirical formula $C_{28}H_{39}O_{10}MNa_2$ was ascribed to this substance.

Calculated: N = 2.35% Found: N = 2.30%.

EXAMPLE 6

The reaction product of BC 757 with the ethyl ester of isocyanatoacetic acid.

The reaction was performed in the same way as in Examples 4 and 5, each of the two OH-groups of the BC 757 reacting with 1 mol of ethylisocyanatoacetate. The novel compound is readily soluble in water and was ascribed the empirical formula $C_{28}H_{38}O_{11}N_2Ma_2$.

Calculated: N = 4.49%; Found: N = 4.42%.

EXAMPLE 7

The reaction product of BC 757 with β-sulphopropionic anhydride.

1 g of β-sulphopropionic anhydride and 2.0 g of BC 757 were dissolved in 50 ml of dioxane. After reaction, the solution was evaporated in a vacuum until dry and the residue taken up in 50 ml of dioxane containing 3.7 ml of a 2N-solution of NaOH. After again concentrating at reduced pressure the sodium salt was precipitated in the form of a white fine crystalline powder. The novel compound dissolved well in water.

Summary formula of the compound: $C_{25}H_{37}O_9SNa$.
Calculated: C = 55.95%, H = 6.95% Found: C = 55.7% H = 6.8%.

EXAMPLE 8

The reaction product of BC 757 with m-carboxybenzene sulphochloride.

2 g of m-carboxybenzene sulphochloride were reacted with 3.2 g of BC 757 in pyridine. The solvent was then driven off in a vacuum and the residue taken up in other. The organic phase was extracted with water and then shaken out with a solution of NaHCO$_3$ in order to convert the free acid to the sodium salt. After the aqueous phase had been submitted to freeze-drying 3.1 g of Na-BC 757 m-sulphobenzoate were obtained.

Summary formula: $C_{29}H_{37}O_9SNa$.
Calculated: C = 59.6%, H = 6.4% Found: C = 59.2%, H = 6.2%.

EXAMPLE 9

5 g of chloroacetyl chloride (CH$_2$ClCoCl) were reacted with 0.5 g of BC 757 in a mixture of pyridine and dioxane. The mixture was introduced into water with cooling, the precipitated reaction product dissolved in ethyl acetate, contracted with water, the organic phase de-watered and concentrated in vacuo until dry. 2.5 g of an absolutely dry dimethylamino in 50 ml of methylcyanide were added to the residue at −10° C. As soon as the mixture had reached room temperature the solvent was removed in vacuum, the residue in the form of the hydrochloride dissolved in water, extracted with ether and then lyophilised from this solvent. The product (8.2g) is readily water-soluble in the form of the hydrochloride. Th empirical formula $C_{30}H_{40}O_7N_2$ was ascribed to the free base.

Calculated: C = 65.65%, H = 0.85%; H = 5.11% Found: C = 65.1%, H = 0.65%, H = 4.95%.

In addition to these antibiotically active agents the ready mixed foods or food supplements according to the present invention may contain the usual additives such as protein concentrates, fish meals, dried mycolia, particularly from the production of penicillin, dried blood and/or mineral substances and/or vitamins.

In a preferred embodiment of the present invention the difficultly water-soluble antibiotic BC 757 is incorporated in a ready mixed food. BC 757 is only slightly resorbed in the intestine. High resorbtion, however, is not essential to the efficacy of an antibiotic in an animal food as shown by the use in the prior art animal foods of bacitracin, which is only slightly resorbed in the intestine.

A particular advantage of the antibiotic BC 757 is that it is entirely stable both as a pure substance and in admixture with fish meals which often attack antibiotic additives.

The storage keeping proportion of both a food supplement containing 10% BC 757 as well as a protein concentration containing 0.15 mg of BC 757 per gram and of a ready mixed fattening food with a content of 0.021 mg of BC 757 per gram were tested at 24° and 37° C. Over a period of six months samples were taken at intervals of one month, the antibiotic being extracted and tested. No decrease in the amount of antibiotic occurred.

For achieving an optimum rate of gain and in improved utilization of the food by farm animals an addition of the antibiotic BC 757 or of its derivatives, particularly of its water-soluble derivatives, in concentrations that are conventional in the case of antibiotics hitherto used is sufficient. In other words, ready mixed foods according to the invention should contain the following quantities of BC 757 per kg of the mixture:

for poultry — 2.5 to 50 mg
for pigs — 10.0 to 50 mg and for calves and beef cattle the food supplements according to the invention should be fed in quantities to provide the animal with between 25 and 70 mg of BC 757 per day.

The results of tests hereunder described illustrate the advantages of the use of the antibiotic BC 757 and its derivatives compared with antibiotics hitherto used in food supplements and ready-mixed foods and show the extent of growth stimulation that can be achieved with ready-mixed foods and/or supplements according to the invention.

EXAMPLE 1

(a) A ready-mixed food for fattening pigs.

100 g of BC 757 were thoroughly mixed in a ball mill with 900 g of a dry mycolium from the fermentation of penicillin. The food supplement thus obtained was processed into a protein concentrate containing per kg 150 mg of BC 757, 500 g of blood meal, 250 g of fish meal, 91 g of extracted peanut meal, 80 g of extracted soybean meal, 35 g of phosphate of lime, 31 g of carbonate of lime, 5 g of iodised cattle salt and 7.5 g of a conventional mixture of vitamins and trace elements. The ready-mixed food used during the initial fattening period consisted of 860 g of wholemeal barley and 140 g of the protein concentrate, whereas for the second fattening period it consisted of 530 g of wholemeal barley, 420 g of wholemeal maize and 50 g of protein concentrate per kg of food.

(b) Fattening test.

The following pig fattening tests were carried out with a ready-mixed food containing BC 757 and prepared as described under (a):

40 piglets each weighing 15 kg were equally fed until their weight had risen to an average of 29 kg. Thereafter, and until their live weight had reached about 50 kg, they were fed with a food containing 10% of raw protein. 24 trial animals received the above-mentioned ready-mixed food containing 21 mg of BC 757 per kg whereas 24 control animals received an analogous food which instead of BC 757 contained the same quantity of chlorotetracycline per kg. From the time the live weight reached 50 kg to the time of slaughtering the animals received a food containing 12% of raw protein, with an addition of 7.8 mg of BC 757 per kg to the trial food and an addition of 7.5 mg of chlorotetracycline per kg to the control food. The results of the test are compiled in the following table:

|  | Control Group | Trial Group |
|---|---|---|
| Gain during fattening period total | 1557 kg | 1006 kg |
| Gain during fattening period per animal | 64.073 kg | 66.933 kg |
| Food utilization during the fattening period | 4.194 | 3.979 |

EXAMPLE 2

Ready-mixed food for fattening poultry.

A food supplement was prepared from 100 g of BC 757 succinate and 900 g of dry mycolium from the production of penicillin, as described in Example 1. This was incorporated in the following foods to provide a fattening food containing 10 mg of BC 757 succinate per kg: 500 g of wholemeal maize, 190 g of coarse soybean meal, 90 g of fish meal, 74.4 g of wheat bran, 20 g of phosphate of lime, 12.5 g of carbonate of lime, 5 g of iodised cattle salt, 10 g of shredded green lucerne, 0.5 g of DL-methionine and 7.5 g of a conventional mixture of vitamins and trace elements.

EXAMPLE 3

A ready-mixed food for fattening poultry was prepared analogously to Example 2 excepting that BC 757 palmitate was used instead of BC 757 succinate. The first-named compound can be prepared as follows:

3 g of palmitic acid chloride are heated in a benzene-pyridine mixture (10:1) together with 4.1 g of BC 757 and kept at 100° C for 30 minutes. The solvent is then completely removed under reduced pressure. The residue is twice recrystallized from benzene. 5.2 g of BC 757 palmitate are thus obtained.

The empirical formula $C_{38}H_{64}O_6$ was ascribed to this compound.

Calculated: C = 73.97%, H = 10.47% Found: C = 73.3%, H = 10.2%.

The following examples illustrate the production of water-soluble derivatives of the antibiotic BC 757, which may be used in the ready mixed foods or in the food supplements for preparing such ready-mixed foods, respectively.

A summary of all the fattening experiments hitherto effected by us with pigs and poultry and the examinations for therapy is given below.

1. FATTENING EXPERIMENTS

1.1 Pig fattening experiments 1.1.1. Fattening experiment, with 21 control animals and 21 test animals.

|  | Control group | Test group |
|---|---|---|
| Total increase during fattening | 1453 kg | 1527 kg |
| Average increase per animal | 69.190 kg | 77.476 kg |
| Average daily increase | 0.671 kg | 0.856 kg |
| Feed evaluation | 1 : 3.936 | 1 : 3.823 |
| Fattening period | 77 days | 86 days |

1.1.2. Fattening experiment with 24 control animals and 24 test animals.

|  | Control group | Test group |
|---|---|---|
| Total increase during |  |  |

-continued

|  | Control group | Test group |
|---|---|---|
| fattening period | 2007.5 kg | 1758.5 kg |
| Average increase per animal | 83.646 kg | 73.271 kg |
| Average daily increase | 0.621 kg | 0.797 kg |
| Feed evaluation | 1 : 3.843 | 1 : 3.718 |
| Fattening period | 106.5 days | 96.5 days |

1.1.3. Fattening experiment, started on 17.3.1964 with 24 control animals and 24 test animals

|  | Control group | Test group |
|---|---|---|
| Total increase during fattening period | 1683 kg | 1641 kg |
| Average increase per animal | 70.125 kg | 68.375 kg |
| Average daily increase | 0.752 kg | 0.790 kg |
| Feed evaluation | 1 : 3.577 | 1 : 3.632 |
| Fattening period | 93 days | 86 days |

1.1.4. Fattening experiments were effected with 4 groups of 12 pigs each in the test groups and 8 pigs in the control group.

```
1 = BC 757 10 ppm
2 = terramycin 20 ppm
3 = mycelium of BC 757 fermentations 2.5% of the
    total ration
4 = control without admixture
```

|  | 1 | 2 | 3 | 4 |
|---|---|---|---|---|
| Increase during fattening period | 743 kg | 727 kg | 699 kg | 494 kg |
| Food evaluation | 1:3.418 | 1:3.420 | 1:3.448 | 1.3.544 |
| Average daily increase per animal | 794 g | 777 g | 747 g | 792 g |

1.1.5. Fattening experiments with mycelium of BC 757 fermentations.

5.1. Experiments were effected with 14 pigs as control group without admixture and 10 pigs as test group, to which mycelium was added to 5% of the total ration.

|  | Control group | Test group |
|---|---|---|
| Total increase | 878 kg | 675 kg |
| Average increase per animal | 62.71 kg | 67.5 kg |
| Average daily incrase per animal | 836 g | 900 g |
| Feed evaluation | 1:3.54 | 1:3.48 |
| Fattening period | 75 days | 75 days |

5.2. The above test was repeated with 36 pigs in each group.

|  | Control group | Test group |
|---|---|---|
| Total increase | 2458 kg | 2503 kg |
| Average increase per animal | 68.277 kg | 69.528 kg |
| Average daily increase per animal | 669 g | 724 g |
| Feed evaluation | 1:3.809 | 1:3.855 |
| Fattening period | 102 days | 96 days |

1.1.6. Experiments were effected with undersized young pigs using mycelium from BC 757 fermentations. The results show that the addition of the antibiotic to the feed exerts a positive influence on the growth of the young pigs. For this test 12 young pigs from each of 3 broods of the same age in 2 test groups were secluded together for purposes of habituation 14 days before commencement of the test and were freed from worms in a routinary manner. The male animals were castrated at the age of 4 weeks. Upon commencement of the test, at the age of 10 weeks, 8 young pigs were selected from each group in such a manner that the sex proportion and initial weight of each of the 2 groups were quite balanced.

| FEED COMPOSITION | | | | |
|---|---|---|---|---|
|  | a) up to an average of 50 kg live weight | | b) from 50 kg live weight until slaughtering | |
|  | BC 757 mycelium | control | BC 757 mycelium | control |
| coarse ground barley | 57 | 57 | 47 | 47 |
| coarse ground corn | — | — | 15 | 15 |
| coarse ground wheat | 7 | 7 | — | — |
| coarse ground oats | 10 | 10 | — | — |
| coarse ground soy beans | 10.5 | 13 | 8.5 | 11 |
| fish meal | 3.5 | 6 | 2.5 | 5 |
| coarse ground rye | — | — | 10 | 10 |
| low-grade wheat flour | 5 | 5 | 10 | 10 |
| mixture of mineral matter | 2 | 2 | 2 | 2 |
| BC 757 | 5 | — | 5 | — |

In the BC 757 mycelium test group 2½% of coarse ground soybeans and 2½% of fish meal were replaced by 5% of BC 757 mycelium. The addition of vitamins to the feed was identical in both test groups.

The daily feeding quantities were completely identical by weight for the two groups.

| TABULAR SUMMARY | | |
|---|---|---|
|  | BC 757 mycelium group | Control group |
| Number of animals | 8 | 8 |
| Sex | 1 : 1 | 1 : 1 |
| Average initial weight | 27.6 kg | 27.9 kg |
| Average final weight | 109.8 kg | 99.94 kg |
| Duration of test | 115 days | 115 days |
| Average total increase | 82.2 kg | 72.04 kg |
| Averag daily increase | 715 g | 626 g |
| Total feed consumption | 2,170 kg | 2,171 kg |
| Evaluation figure | 3,305 kg | 3,767 kg |

The BC 757 mycelium group showed a clearly better evaluation figure and better weight increases as compared with the control group.

1.1.7. The comparative experiments carried out with 50 fattening pigs in each group have shown the following results:

| Control group: | Initial weight: | φ15.2 kg on 29.7.1966 |
|---|---|---|
|  | Slaughtering weight: | φ94.1 kg on 21.11.1966 |
|  | Feed evaluation: | 1 : 2.80 |
|  | Losses: | 4 |
|  | Antibiotic: | ASF 250 |
| Test group: | Initial weight: | φ15.8 kg on 29.7.1966 |
|  | Slaughtering weight | φ92.2 kg on 21.11.1966 |
|  | Feed evaluation: | 1 : 2.65 |
|  | Losses: | none |
|  | Antibiotic: | BC 757 |
|  |  | 60 ppm in the 1st fattening period |

31.6 ppm in the 2nd fattening period
12.3 ppm in the 3rd fattening period

1.2. POULTRY FATTENING EXPERIMENTS 1.2.1. Comparative fattening experiments were effected from 15.4.-10.6.1964 (maintenance in cages) with the feed indicated in Example 2 (ready feed for poultry fattening: 10 ppm BC 757). The experiments were effected in the Poultry Laboratory of Prof. Dr. Gratzl in the Veterinary College in Vienna; 50 chickens were used in each group.

1 = BC 757 10 ppm
2 = aureomycin 10 ppm
3 = comparison without antibiotic

|  | 1 | 2 | 3 |
|---|---|---|---|
| Total increase | 60,570 g | 58,630 | 55,680 g |
| Average increase per animal | 1,211 g | 1,172 g | 1,112 g |
| Feed evaluation | 1:2.69 | 1:2.93 | 1:3.18 |

1.2.2. Two series of experiments with different antibiotics were effected on a total of 5,400 chickens:

| Experiment series 1) | | 1 = control<br>2 = 15 ppm aureomycin<br>3 = 4.4 ppm tylosin<br>4 = 4.25 ppm spiramycin<br>5 = 15 ppm aureovit (chlorotetracyclin) | | | |
|---|---|---|---|---|---|
|  | 1 | 2 | 3 | 4 | 5 |
| Increase during the fattening period (kg) | 1.45 | 1.44 | 1.48 | 1.46 | 1.48 |
| Feed utilization (kg) | 2.24 | 2.21 | 2.18 | 2.20 | 2.20 |
| Losses (%) | 2.89 | 3.33 | 7.33 | 8.89 | 4.82 |

| Experiment series 2) | | 1 = control<br>2 = 4 ppm erythromycin<br>3 = 10 ppm erythromyoin<br>4 = 5 ppm BC 757<br>5 = 10 ppm BC 757<br>6 = 15 ppm BC 757 | | | | |
|---|---|---|---|---|---|---|
| Increase during the fattening period (kg) | 1.36 | 1.34 | 1.35 | 1.35 | 1.33 | 1.32 |
| Feed utilization (kg) | 2.30 | 2.28 | 2.24 | 2.27 | 2.27 | 2.27 |
| Losses (%) | 1.33 | 0.95 | 1.52 | 1.14 | 0.38 | 1.52 |

1.2.3. A feeding experiment with broilers using BC 757 as compared with the alternative use of penicillin and terramycin was effected. A feed with 10 ppm of BC 757 was used in the test group during the entire experiment. A starter feed with 20 ppm of procain penicillin G was given up to the age of 3 weeks, a main fattening feed with 10 ppm of terramycin was given from the age of 4 to 6 weeks and a final fattening feed with 5 ppm of procain penicillin was given at the age of 7 and 8 weeks.

| Test group | Food consumption | Weight |
|---|---|---|
| 1st to 3rd week from birth | 445 g | 368 g |
| 4th to 6th week from birth | 1431 g | 1030 g |
| 7th and 8th week from birth | 1480 g | 1308 g |
| Total feed consumption: | 3356 g | |
| Feed conversion quota: | 1:2.54 | |
| Control group | | |
| 1st to 3rd week from birth | 443 g | 363 g |
| 4th to 6th week from birth | 1398 g | 1006 g |
| 7th and 8th week from birth | 1442 g | 1280 g |
| Total feed consumption: | 3283 g | |
| Test group | Food consumption | Weight |
| Feed conversion quota: | 1:2.56 | |

Examinations were subsequently effected to determine the residue in the tissues and organs and the antibiotic content in the blood of the test poultry. No residues of antibiotics could be acertained in the muscular substance or in the organs; the content of antibiotic in the blood was also negative, except for 2 non-specific cases.

A further experiment was effected with Clitopilus whole mycelium. The test feed contained 1% of mycelium of the BC 757 production, which was exchanged for 0.5% of fish meal and 0.5% of coarse ground soybeans. The control feed contained 10 ppm of terramycin.

| Control group | Feed consumption | Weight |
|---|---|---|
| 1st to 3rd week from birth | 438 g | 370 g |
| 4th to 6th week from birth | 1380 g | 1040 g |
| 7th and 8th week from birth | 1410 g | 1358 g |
| Total feed consumption: | 3228 g | |
| Feed conversion quota: | 1:2.37 | |
| Test group | | |
| 1st to 3rd week from birth | 442 g | 368 g |
| 4th to 6th week from birth | 1403 g | 1025 g |
| 7th and 8th week from birth | 1454 g | 1352 g |
| Total feed consumption: | 3299 g | |
| Feed conversion quota: | 1:2.44 | |

Particulars of therapeutical tests and indications of the activity of the antibiotic BC 757 and its derivatives is contained in the following description:

The water-soluble derivatives of BC 757 are particularly useful in therapy in that these may be resorbed. As indicated previously, the antibiotic BC 757 is water-insoluble and it was not possible to employ the antibiotic therapeutically. BC 757 derivatives exhibit an effect chiefly directed against gram-positive germs (staphylococci, streptococci). Various microorganisms, e.g staphylococci, which have become resistant to penicillin and other antibiotics, react to BC 757 in a manner analogous to the staphylococci which are sensitive to penicillin. A very good effect against gram-negative microorganisms was ascertained in the case of the Shigella-flexneri group.

The following tests were effected with the water-soluble BC 757 Na-succinate:

(a) Four different staphylococci or micrococci strains were first tested as regards their sensitivity to BC 757. We ascertained that the Staphylococcus aureus SG 511 only develops a sensitivity of 2.5 γ/ml, as does the strain Washington, whereas 2 micrococcus strains isolated from cattle mastitis were as low as 0.6 γ/ml. Subsequently BC 757 was applied to two cows as follows: 400 mg to the right front udder quarter, 200 mg to the right back udder quarter and 100 mg to the left front quarter, dissolved in 10 ml each of distilled water; the left back udder quarter was left as control and only distilled water was applied to it. The application was effected at 4 o'clock in the afternoon after milking out the cows, the first milk was taken the next morning, the following was taken from the milking in the evening and from the milking in the morning. No antibiotically active concentration could be ascertained in any of the milk samples. The sensitivity of the method amounted to 0.6 γ/ml. It may be concluded from this test that the preparation is decomposed or reabsorbed during this period of 15 hours. Further tests using other test germs and other test methods (galtstreptococci, Thermobacterium bulgaricum, etc.) in order to increase the sensitivity of the test method, were unsuccessful. Only later was it possible to find a micrococcus strain from a cattle mastitis which lowered the sensitivity of the method of 0.15 γ/ml.

(b) As above 400 mg were applied to one quarter, 200 mg to the other and 100 mg to the third, each time in 10 ml of distilled water, to 2 animals by instillation after miling out; the last quarter was left as control. In this instance milk samples were taken every hour. It was ascertained that with the 3 dosage methods the content usually reached more than 80 γ/ml after the first hour, in the case of the high dose also once after the second hour. The content then decreased, amounting to only 5–20 γ/ml in the third hour and reached its final value in the 6th hour with 0.3–0.6 γ/ml. On repeating the test, the content of 320 γ/ml was ascertained in the quarter with the highest dose after one hour in the case of one cow. After 3 hours the content in all 3 quarters amounted to between 20 and 40 γ/ml, in the fourth hour between 2.5 and 10 γ/ml, in the fifth hour the content in the milk sank below the ascertainable value of 0.15 γ/ml.

(c) A further test was effected to ascertain the preparation is decomposed by milk. 10 mg of BC 757 were added to 200 ml of milk and the values were taken immediately, 8 hours later and 24 hours later, the milk being kept in a refrigerator. It was found that no loss of effect occurred with our test method.

The antibiotic compounds of the present invention are further indicated for use in treating the illnesses produced by PPLO in different animal species (mycoplasms) and illnesses caused in different animals by coccidia and worm invasions. Due to the stability to heat of the antibiotic compounds of the invention, they are also indicated for use in the canning industry.

What is claimed is:
1. The succinate of pleuromutilin.
2. The glutarate of pleuromutilin.
3. An animal feed product containing, in an antibacterially effective quantity, a compound as set forth in claim 1 and a feed carrier therefor.
4. A veterinary antibiotic composition incorporating as an active ingredient, an anti-bacterially effective amount of a compound as set forth in claim 1, and a therapeutically acceptable carrier therefor.
5. An animal feed product containing, in an anti-bacterially effective quantity, a compound as set forth in claim 2 and a feed carrier therefor.
6. A veterinary antibiotic composition incorporating as an active ingredient, an anti-bacterially effective amount of a compound as set forth in claim 2, and a therapeutically acceptable carrier therefor.

* * * * *